Jan. 18, 1949.  W. C. FERGUSON ET AL  2,459,370
PACKING ASSEMBLY
Filed May 15, 1946

William C. Ferguson,
Paul Sussenbach,
Frank L. Linn,
Inventors.
Haynes and Koenig
Attorneys.

Patented Jan. 18, 1949

2,459,370

UNITED STATES PATENT OFFICE 2,459,370

PACKING ASSEMBLY

William C. Ferguson and Paul Sussenbach, St. Louis, and Frank L. Limn, University City, Mo., assignors to The Presstite Engineering Company, St. Louis, Mo., a corporation of Missouri Application May 15, 1946, Serial No. 669,978

4 Claims. (Cl. 288—13)

This invention relates to a packing assembly and, more particularly, to a packing assembly for sealing an aperture in a wall around one or more conduits or the like passing therethrough.

Among the several objects of the invention may be noted the provision of a packing assembly providing a substantially fluid-tight seal in an aperture in a wall around one or more conduits or the like passing therethrough; the provision of such an assembly comprising a packing which is wedged into sealed engagement with the conduit or conduits and the internal surface of the aperture; the provision of a packing assembly of the class described forming an insulating seal; and the provision of a packing assembly of this class which may be easily manufactured and conveniently installed. Other objects will be in part obvious and in part pointed out hereinafter.

The invention accordingly comprises the elements and combinations of elements, features of construction, and arrangement of parts which will be exemplified in the structures hereinafter described, and the scope of the application of which will be indicated in the following claims.

In the accompanying drawings, in which one of various possible embodiments of the invention is illustrated, Fig. 1 is a front elevation of the packing assembly of our invention, conduits being shown in section;

Similar reference characters indicate corresponding parts throughout the several views of the drawings.

Figure 1:
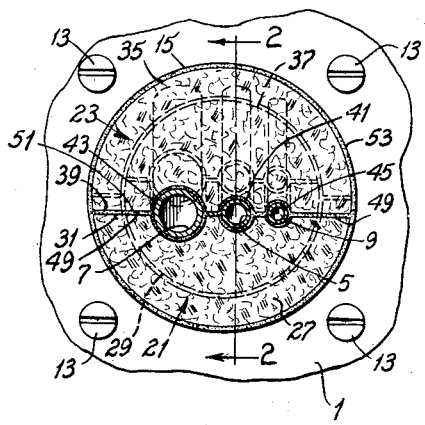
Figure 2:
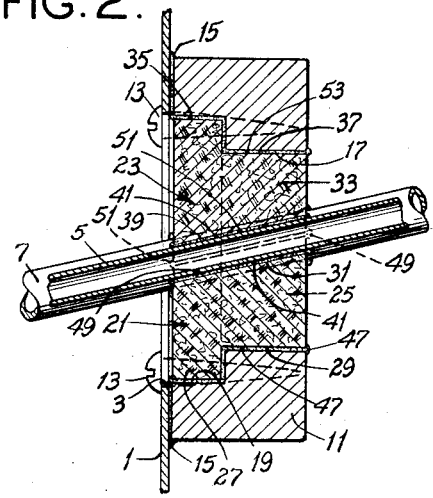
Fig. 2 is a section taken on line 2—2 of Fig. 1.

The packing assembly as herein illustrated is particularly adapted for sealing an aperture in the wall of a refrigerator cabinet through which the refrigerant pipes enter the cabinet. It will be understood, however, that it is also applicable for sealing the aperture in any body through which any type of conduits pass, whether fluid or electrical conduits.

Referring now to the drawing, the sheet-metal wall of the refrigerator cabinet is indicated at 1. An aperture 3 is cut in this wall to provide for passage therethrough of conduits 5, 7 and 9. The central conduit 5 is for compressed refrigerant entering the refrigerator. The large conduit 7 is for expanded refrigerant leaving the refrigerator. The small conduit 9 is a control conduit. It will be understood that it is desirable to seal the aperture around the conduits and at the same time to insulate the interior of the refrigerator cabinet from the exterior.

A pocket-forming block 11 of any suitable material, such as wood, is secured to the wall 1 as by screws 13 with a layer 15 of suitable sealing material therebetween. An example of a suitable sealing material is a low-odor material having about the consistency of putty and which is a composition of either an asphalt or alkyd resin and a plasticizer. The use of a low-odor sealing material is important in refrigerator installations. The block 11 has a bore 17 and a counterbore 19 forming a stepped aperture therethrough for passage of the conduits 5, 7 and 9. The counterbore 19 is coextensive with the aperture 3. The aperture through the block provides an internal surface of considerable extent for engagement with a packing. The internal surface surrounding the aperture 3 is not suitable for effective engagement with a packing, since wall 1 is of thin sheet metal.

The aperture in the block is sealed by a split packing comprising two flanged plugs 21 and 23. Plug 21 comprises a wedge 25 having a flange segment 27 thereon. The wedge 25 has a cylindrical surface 29 fitting the internal cylindrical surface of the aperture and a wedge surface 31 inclined at an acute angle to the axis of the cylindrical surface. This angle is preferably of the order of 10°. The wedge surface 31 diverges from the cylindrical surface 29 in the direction away from the flange.

Plug 23 comprises a wedge 33 having a flange segment 35 thereon. This wedge has a cylindrical surface 37 fitting the internal cylindrical surface of the aperture and a plane wedge surface 39 at the same angle to the axis of the cylindrical surface as wedge surface 31. The wedge surface 39 converges toward the cylindrical surface 37 in the direction away from the flange.

The plugs 21 and 23 are formed of a suitable insulating packing material, preferably of a yieldable material such as a molded cork-asphalt composition. The plugs 21 and 23, in effect, comprise the two parts formed by splitting a flanged cylinder on a plane at an acute angle to the axis of the cylinder. This angle, as stated, is preferably of the order of 10°. Each wedge 25 and 33 may be referred to as being of the shape of an ungula of a stepped cylinder, since each is a section of a stepped cylinder cut by a plane at an angle to its base.

Each of the wedge surfaces 31 and 39 has three semi-cylindrical grooves therein, the axes of these grooves being in the planes of the angular surfaces. When the plugs 21 and 23 are assembled, these grooves provide three passages 41, 43 and 45 extending at an acute angle through the plug for receiving the conduits 5, 7 and 9.

Figure 3:
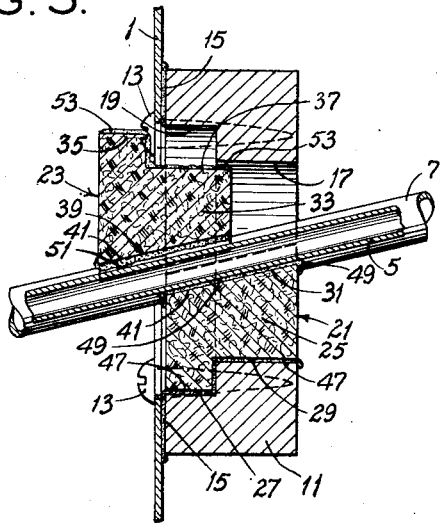
Fig. 3 is a section similar to Fig. 2 but illustrating the position of parts in a preliminary stage of assembly; and, Fig. 4 is a perspective view of a split plug packing employed in the packing assembly.

Referring now more particularly to Fig. 3, which illustrates the manner of installing the packing, the plug 21 is fitted in the aperture in block 11 with a sealing layer 47 of suitable material, such as the above-mentioned sealing material. A substantial layer 49 of sealing material is then applied to the wedge surface 31 and in its grooves. The conduits are passed through the apertures in the wall and block and imbedded in the sealing material in their respective grooves. The conduits become inclined at an angle to the axes of the apertures, due to the inclinations of the grooves.

Figure 4:
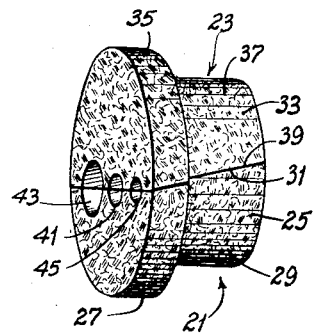

Layers 51 and 53 of sealing material are then applied in the grooves of the plug 23 and on its cylindrical surface 37 and the periphery of flange 35, respectively. The plug 23 is placed on the conduits in the position indicated in Fig. 3 with the conduits engaged in their respective grooves in the wedge surface 39 of the plug. The plug is then wedged into the aperture in the block and to the position indicated in Fig. 4. The inclination of the wedge surfaces 31 and 39 and the inclination of the conduits causes a radial outward movement of the wedge portion 25 of plug 23 as it is driven axially until its cylindrical surface 37 approaches the internal surface of bore 17 in the block. Further axial movement of the plug 23 compresses both this plug 23 and plug 21 in the aperture and upon the conduits and compresses all the layers of sealing material to effect a tight seal. The plug 23 is driven into the aperture in the block to dispose its wedge 33 in bore 17 and its flange segment 35 in counterbore 19 (Fig. 4).

Thus there is provided a substantially fluid-tight insulating seal for the aperture through the refrigerator cabinet wall around the three conduits 5, 7 and 9 passing therethrough. The packing comprising the plugs 21 and 23 is wedged into tight engagement in the aperture and upon the conduits by one of its own elements, namely, plug 23. The use of the packing assembly requires no modification of the sheet-metal wall 1 other than to cut the aperture 3 therein and hence its installation is readily effected.

It will be understood that the packing assembly may be employed where only one conduit, rather than a plurality, passes through an aperture in a wall, and that it is applicable in any wall to the installation of any types of conduits, fluid or electrical. If the wall is of substantial thickness, the use of the block 11 may be eliminated by forming the recesses 17—19 directly in the wall.

The stepped exterior forms of the plugs 21 and 23, together with the stepped interior forms of the openings 17 and 19, provide for easy assembly. Thus the bottom plug 21 has a definite limiting stop when initially positioned and the same is true of the upper plug when it is finally wedged home. Thus all necessary assembly operations are perfectly definite, requiring no critical manipulations.

The outside stepped cylindrical surfaces of the plugs are class examples of surfaces of revolution in general that may be used for the exterior forms of the plugs.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

We claim:

1. A packing comprising two plugs, each plug comprising an ungulate wedge having end surfaces, a partial cylindrical surface and a planar wedge surface inclined at an acute angle to the longitudinal axis of said cylindrical surface, said wedge surface intersecting said end surfaces, said plugs forming a cylinder when assembled with said wedge surfaces in coextensive engagement, each of said wedge surfaces having a groove therein opposite the groove in the other, said grooves providing an inclined passage along said engaged surfaces and between the end surfaces for a conduit or the like through the packing when said plugs are so assembled.

2. A packing comprising two plugs, each plug comprising an ungulate wedge having end surfaces, a stepped partial cylindrical surface and a planar wedge surface inclined at an acute angle to the longitudinal axis of its cylindrical surface, said wedge surface intersecting said end surfaces, said plugs forming a stepped cylinder when assembled with said wedge surfaces in coextensive engagement, each of said wedge surfaces having a groove therein opposite the groove in the other, said grooves providing an inclined passage along said engaged surfaces and between the end surfaces for a conduit or the like through the packing when said plugs are so assembled.

3. A packing comprising two plugs, each plug comprising an ungulate wedge having end surfaces, a partial stepped outside surface of revolution and a planar wedge surface inclined at an acute angle to the longitudinal axis of said outside surface, said wedge surface intersecting said end surfaces, said plugs forming a stepped cylinder when assembled with said wedge surfaces in coextensive engagement, said wedge surfaces having cooperating grooves therein extending between said end surfaces, said grooves providing an inclined passage for a conduit or the like through the packing when said plugs are so assembled, and a pocket member having a stepped inside cylinder for nesting the stepped cylinder formed by the assembled plugs, the step of the pocket forming a limiting stop for the step of the plugs after wedging between said wedge surfaces.

4. A packing comprising two plugs having surfaces of revolution with a common longitudinal axis, each plug comprising end surfaces and a wedge surface thereon intersecting said end surfaces and inclined at an angle to said longitudinal axis, each said wedge surface having a groove therein extending between the end surfaces, said grooves providing an inclined passage through the packing along said wedge surfaces for a conduit or the like when the plugs are assembled with said surfaces in engagement.

WILLIAM C. FERGUSON.
PAUL SUSSENBACH.
FRANK L. LIMN.

REFERENCES CITED

The following references are of record in the file of this patent:

UNITED STATES PATENTS

| Number | Name | Date |
|---|---|---|
| 766,855 | Weeden | Aug. 9, 1904 |
| 1,205,017 | Rathke | Nov. 14, 1916 |
| 1,174,598 | Mix | Mar. 7, 1916 |
| 1,823,233 | Bell | Sept. 15, 1931 |
| 1,830,060 | Holbrook | Nov. 3, 1931 |
| 1,952,695 | Webb et al. | Mar. 27, 1934 |
| 1,990,916 | Oldham | Feb. 12, 1935 |
| 2,358,367 | Van Meerbeke | Sept. 19, 1944 |
| 2,365,785 | Tinnermann | Dec. 26, 1944 |

FOREIGN PATENTS

| Number | Country | Date |
|---|---|---|
| 7,995 | Germany | Nov. 21, 1879 |